(12) United States Patent
Zhao (10) Patent No.: US 10,901,890 B2
(45) Date of Patent: Jan. 26, 2021

(54) MEMORY RECLAIMING METHOD AND APPARATUS

(71) Applicant: HUAWEI TECHNOLOGIES CO., LTD., Guangdong (CN)

(72) Inventor: Junmin Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/171,304

(22) Filed: Oct. 25, 2018

(65) Prior Publication Data

US 2019/0065368 A1   Feb. 28, 2019

Related U.S. Application Data

(63) Continuation of application No. PCT/CN2016/080374, filed on Apr. 27, 2016.

(51) Int. Cl.
*G06F 12/02* (2006.01)
*G06F 9/50* (2006.01)
(Continued)

(52) U.S. Cl.
CPC ........ *G06F 12/0253* (2013.01); *G06F 9/5016* (2013.01); *G06F 9/5022* (2013.01);
(Continued)

(58) Field of Classification Search
None
See application file for complete search history.

(56) References Cited

U.S. PATENT DOCUMENTS 6,128,713 A   10/2000   Eisler et al.
6,898,602 B2   5/2005   Sayag
(Continued)

FOREIGN PATENT DOCUMENTS

CN   101833512 A   9/2010
CN   103500121 A   1/2014
(Continued)

OTHER PUBLICATIONS

Extended European Search Report issued in European Application No. 16899776.5 dated Mar. 11, 2019, 10 pages.
(Continued)

*Primary Examiner* — Charles J Choi
(74) *Attorney, Agent, or Firm* — Fish & Richardson P.C.

(57) ABSTRACT

Example memory reclaiming methods and apparatuses are provided to resolve a problem that application data is lost and a restart speed of an application becomes slower in a manner of reclaiming a memory by killing the application. One example memory reclaiming method includes determining an application program that occupies a to-be-reclaimed memory and selecting at least one virtual address space segment according to a running state of the application program. A virtual address space that is in the selected at least one virtual address space segment and that is occupied by the application program is reclaimed. The application program is not directly killed, but instead, only a memory occupied by application data that can be cleared in the running state is reclaimed according to the running state of the application program. Therefore, less application data is lost.

17 Claims, 6 Drawing Sheets

(51) Int. Cl.
   *G06F 12/08* (2016.01)
   *G06F 12/122* (2016.01)
(52) U.S. Cl.
   CPC ............ *G06F 12/08* (2013.01); *G06F 12/122* (2013.01); *G06F 2209/508* (2013.01); *G06F 2212/1032* (2013.01); *G06F 2212/1044* (2013.01); *G06F 2212/152* (2013.01); *G06F 2212/171* (2013.01); *G06F 2212/657* (2013.01)

(56) References Cited

U.S. PATENT DOCUMENTS

| | | | |
|---|---|---|---|
| 9,710,165 B1 * | 7/2017 | Lherault | G06F 3/0608 |
| 2003/0200530 A1 | 10/2003 | Sayag | |
| 2008/0141283 A1 | 6/2008 | Minemura et al. | |
| 2012/0260058 A1 | 10/2012 | Matsuzaki | |
| 2017/0242790 A1 * | 8/2017 | O'Krafka | G06F 3/0604 |

FOREIGN PATENT DOCUMENTS

| | | |
|---|---|---|
| CN | 103645955 A | 3/2014 |
| CN | 104484282 A | 4/2015 |
| WO | 1999015963 A1 | 4/1999 |

OTHER PUBLICATIONS

International Search Report and Written Opinion issued in International Application No. PCT/CN2016/080374 dated Jan. 10, 2017, 36 pages.
Office Action issued in Chinese Application No. 201680014809.7 dated Jan. 19, 2020, 7 pages.

* cited by examiner

MEMORY RECLAIMING METHOD AND APPARATUS

CROSS-REFERENCE TO RELATED APPLICATIONS

This application is a continuation of International Application No. PCT/CN2016/080374, filed on Apr. 27, 2016, the disclosure of which is hereby incorporated by reference in its entirety.

TECHNICAL FIELD

This application relates to the field of computer technologies, and in particular, to a memory reclaiming method and apparatus.

BACKGROUND

A memory is an important part of a computer or another intelligent terminal such as a mobile phone. An application program on a terminal usually runs in memory, and data used by many application programs needs to be stored in the memory.

During memory reclaiming performed on an application program, an on-demand (on-demand) memory reclaiming manner is used in some mechanisms. That is, when a new application is started and it is found that a memory is insufficient, some application programs that run in background are killed (KILL), to clean up the memory occupied by the application programs. In some mechanisms, a pre-cleaning manner is used. That is, to release a memory with relatively low utilization in a system in time, before it is found that the memory is insufficient, some application programs of low priorities are killed according to application program priorities.

Regardless of an on-demand memory reclaiming mechanism or a pre-cleaning memory reclaiming mechanism, an application program is directly killed during memory reclaiming. In this manner, because a memory occupied by the application program is completely cleaned up, application data may be lost. In addition, when a user restarts the application program, a start speed becomes slower.

SUMMARY

Embodiments of this application provide a memory reclaiming method and apparatus, to reduce application data loss during memory reclaiming, and improve an application restart speed.

An embodiment of this application provides a memory reclaiming method, including:

determining an application program that occupies a to-be-reclaimed memory;

selecting, according to a running state of the application program, at least one virtual address space segment from multiple virtual address space segments occupied by the application program; and reclaiming virtual address space that is in the selected at least one virtual address space segment and that is occupied by the application program.

According to the foregoing method, during memory reclaiming, the application program is not directly killed, but instead, only virtual address space that can be cleaned up in the running state is reclaimed according to the running state of the application program. In this way, in some running states (running states other than an idle process state), entire memory space occupied by the application program may not be cleaned, so that less application data is lost, and in addition, a restart speed of the application program can further be improved.

In the foregoing method, the determining an application program that occupies a to-be-reclaimed memory includes:

determining, according to a running state of each application program on a terminal, the application program that occupies the to-be-reclaimed memory.

In the foregoing method, the selecting, according to a running state of the application program, at least one virtual address space segment from multiple virtual address space segments occupied by the application program includes:

selecting the at least one virtual address space segment according to reclaiming priorities separately corresponding to virtual address space segments that can be reclaimed in the running state.

Corresponding to memory reclaiming, this application further provides a memory allocation manner:

selecting one virtual address space segment from preset multiple virtual address space segments according to a first data type of application data to which a memory is to be allocated, and allocating virtual address space that is in the selected virtual address space segment to the application data, where the first data type of the application data is corresponding to a preset access frequency range.

By using such a memory allocation mechanism, the application data may be allocated to the corresponding virtual address space segment according to the data type. In this way, during memory reclaiming, memory space in the virtual address space segment corresponding to a type of reclaimable data may be selected according to the running state of the application program, to selectively reclaim the memory occupied by the application program.

In the foregoing method, a type of the application data to which the memory is to be allocated further includes a second data type, and an access frequency range of the second data type is different from the access frequency range of the first data type.

In the foregoing method, the first data type of the application data is determined according to the following steps:

determining, according to monitored frequency on which the application data is accessed in the memory and preset multiple access frequency ranges, the access frequency range corresponding to the application data; and determining the first data type of the application data according to the access frequency range corresponding to the application data.

Based on the newly-defined data types corresponding to the preset access frequency ranges in this embodiment of this application, less-frequently accessed application data may be differentiated. During memory reclaiming, the less-frequently accessed application data may be preferably reclaimed, so that memory reclaiming is optimized, and user experience is improved.

An embodiment of this application provides a memory reclaiming apparatus, including:

a determining module, configured to determine an application program that occupies a to-be-reclaimed memory;

a selection module, configured to select, according to a running state of the application program determined by the determining module, at least one virtual address space segment from multiple virtual address space segments occupied by the application program; and a memory reclaiming module, configured to reclaim virtual address space that is in the at least one virtual address space segment selected by the selection module and that is occupied by the application program.

According to the foregoing apparatus, during memory reclaiming, the application program is not directly killed, but instead, only virtual address space that can be cleaned up in the running state is reclaimed according to the running state of the application program. In this way, in some running states (running states other than an idle process state), the entire memory occupied by the application program may not be cleaned, so that less application data is lost, and in addition, a restart speed of the application program can further be improved.

In the foregoing apparatus, the determining module is specifically configured to:

determine, according to a running state of each application program on a terminal, the application program that occupies the to-be-reclaimed memory.

the selection module is specifically configured to:

select the at least one virtual address space segment according to reclaiming priorities separately corresponding to virtual address space segments that can be reclaimed in the running state.

the foregoing apparatus further includes:

a memory allocation module, configured to: select one virtual address space segment from preset multiple virtual address space segments according to a first data type of application data to which a memory is to be allocated, and allocate virtual address space that is in the selected virtual address space segment to the application data, where the first data type of the application data is corresponding to a preset access frequency range.

In the foregoing apparatus, a type of the application data to which the memory is to be allocated further includes a second data type, and an access frequency range of the second data type is different from the access frequency range of the first data type.

The memory allocation module is specifically configured to determine the first data type of the application data according to the following steps:

determining, according to monitored frequency on which the application data is accessed in the memory and preset multiple access frequency ranges, the access frequency range corresponding to the application data, and determining the first data type of the application data according to the access frequency range corresponding to the application data.

By using such a memory allocation mechanism, the application data may be allocated to the corresponding virtual address space segment according to the data type. In this way, during memory reclaiming, memory space in the virtual address space segment corresponding to a type of reclaimable data may be selected according to the running state of the application program, to selectively reclaim the memory occupied by the application program.

Based on the newly-defined application data types in this embodiment of this application, less-frequently accessed application data may be differentiated. During memory reclaiming, the less-frequently accessed application data may be preferably reclaimed, so that memory reclaiming is optimized, and user experience is improved.

This application provides a terminal, including a processor, a storage, and communications bus. The communications bus is configured to implement a connection and communication between these components, and the storage includes memory and an external storage. The memory herein is also referred to as an internal storage, and is configured to temporarily store operational data in the processor, and data exchanged by the processor with an external storage such as a hard disk. The processor exchanges data with the external storage by using the memory.

The storage stores the following elements: an executable module or a data structure, or a subset thereof, or an extension set thereof.

An operating system includes various system programs, and may have two running levels: a kernel mode and a user mode. When a process performs system invoking but is trapped in kernel code for running, the process is in a kernel running mode that is referred to as a kernel mode for short. When the process is in the kernel mode, kernel code to be executed uses a kernel stack of the current process. Each process has a kernel stack. When user code is executed in the process, the process is in a user running mode that is referred to as a user mode for short. In this case, the processor runs in user code of a lowest privilege level.

An application program module includes various application programs.

In this embodiment of this application, by invoking a program or an instruction stored in the storage, the processor performs the following operations:

determining an application program that occupies a to-be-reclaimed memory;

selecting, according to a running state of the application program, at least one virtual address space segment from multiple virtual address space segments occupied by the application program; and reclaiming virtual address space that is in the selected at least one virtual address space segment and that is occupied by the application program.

During memory reclaiming performed by the foregoing device, the application program is not directly killed, but instead, only virtual address space that can be cleaned up in the running state is reclaimed according to the running state of the application program. In this way, in some running states (running states other than an idle process state), the entire memory occupied by the application program may not be cleaned, so that less application data is lost, and in addition, a restart speed of the application program can further be improved.

In the foregoing device, the processor is specifically configured to:

determine, according to a running state of each application program on the terminal, the application program that occupies the to-be-reclaimed memory.

In the foregoing device, the processor is specifically configured to:

select the at least one virtual address space segment according to reclaiming priorities separately corresponding to virtual address space segments that can be reclaimed in the running state.

In addition, corresponding to reclaim the memory, the processor may allocate the memory based on the following mechanisms:

selecting one virtual address space segment from preset multiple virtual address space segments according to a first data type of application data to which a memory is to be allocated, and allocating virtual address space that is in the selected virtual address space segment to the application data, where the first data type of the application data is corresponding to a preset access frequency range.

By using such a memory allocation mechanism, the application data may be allocated to the corresponding virtual address space segment according to the data type. In this way, during memory reclaiming, memory space in the virtual address space segment corresponding to a type of reclaimable data may be selected according to the running state of the application program, to selectively reclaim the memory occupied by the application program.

In the foregoing device, a type of the application data to which the memory is to be allocated further includes a second data type, and an access frequency range of the second data type is different from the access frequency range of the first data type.

In the foregoing device, the processor is specifically configured to determine the first data type of the application data according to the following steps:

determining, according to monitored frequency on which the application data is accessed in the memory and preset multiple access frequency ranges, the access frequency range corresponding to the application data, and determining the first data type of the application data according to the access frequency range corresponding to the application data.

Based on the newly-defined application data types in this embodiment of this application, less-frequently accessed application data may be differentiated. During memory reclaiming, the less-frequently accessed application data may be preferably reclaimed, so that memory reclaiming is optimized, and user experience is improved.

DESCRIPTION OF EMBODIMENTS

Embodiments of this application put forward a new memory reclaiming mechanism. That is, during memory reclaiming, an application program is not directly killed to completely clean up a memory occupied by the application program, but instead, a memory, corresponding to a running state of the application program, occupied by application data that can be claimed is reclaimed according to the running state. Herein, each running state is corresponding to at least one reclaimable virtual address space segment, and application data that can be cleared in the running state is stored in actual physical memory space corresponding to the reclaimable virtual address space segment.

Figure 1:
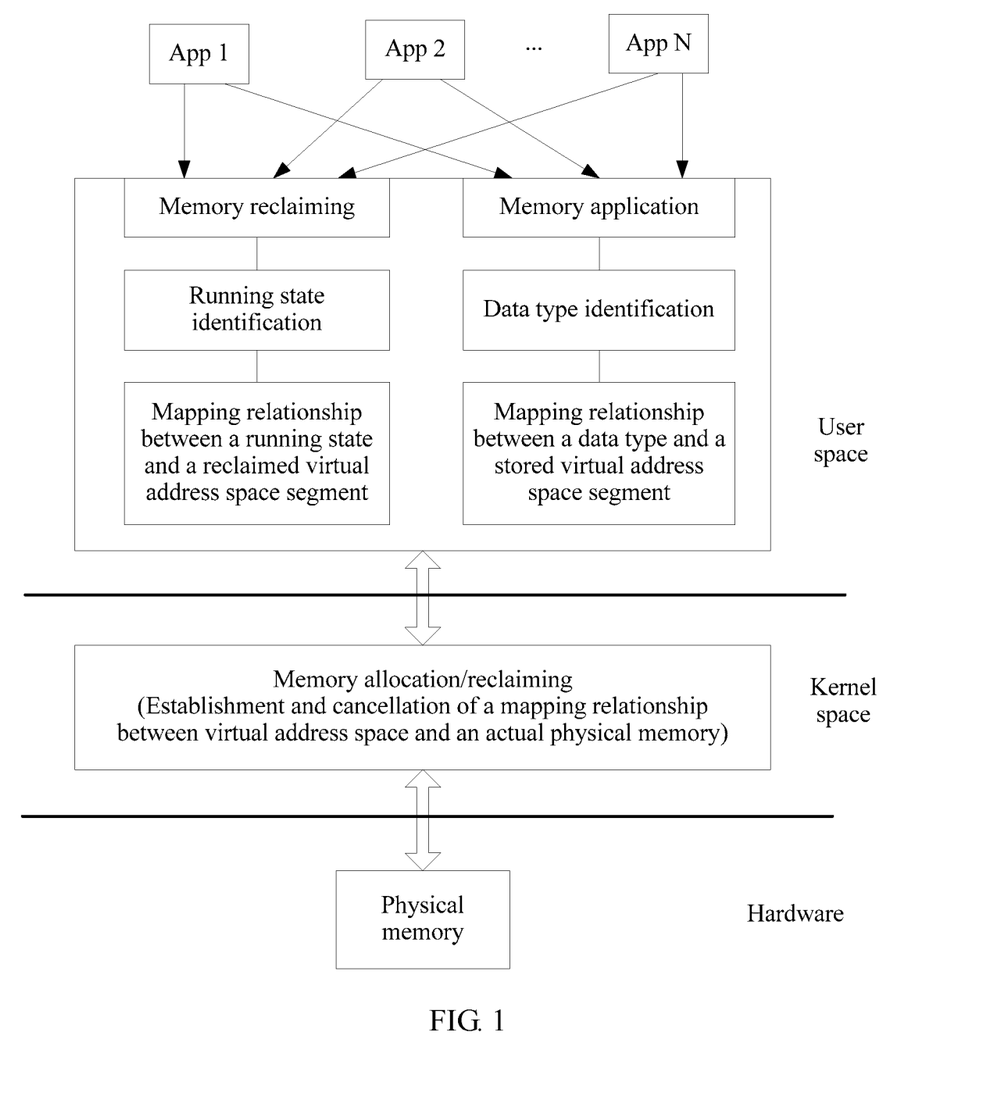
FIG. 1 is a schematic diagram of memory allocation/reclaiming according to this application.

As shown in FIG. 1, in this application, a memory allocation/reclaiming policy is run in a user mode, and actual physical memory space is allocated/reclaimed in a kernel mode. That is, during memory allocation, in the user mode, a data type of to-be-stored application data is identified, and a virtual address space segment corresponding to the data type is determined. Then in the kernel mode, actual physical memory space is allocated, and a mapping relationship between virtual address space allocated to the application program and the actual physical address space is established. During memory reclaiming, in the user mode, a running state of an application program is identified, at least one virtual address space segment is selected based on the running state, virtual address space that is in the selected virtual address space segment and that is occupied by the application program is reclaimed, and a mapping relationship between the virtual address space occupied by the application program and actual physical memory space is cancelled.

The embodiments of this application are further described in detail below with reference to the accompanying drawings of this specification.

Embodiment 1

Figure 2:
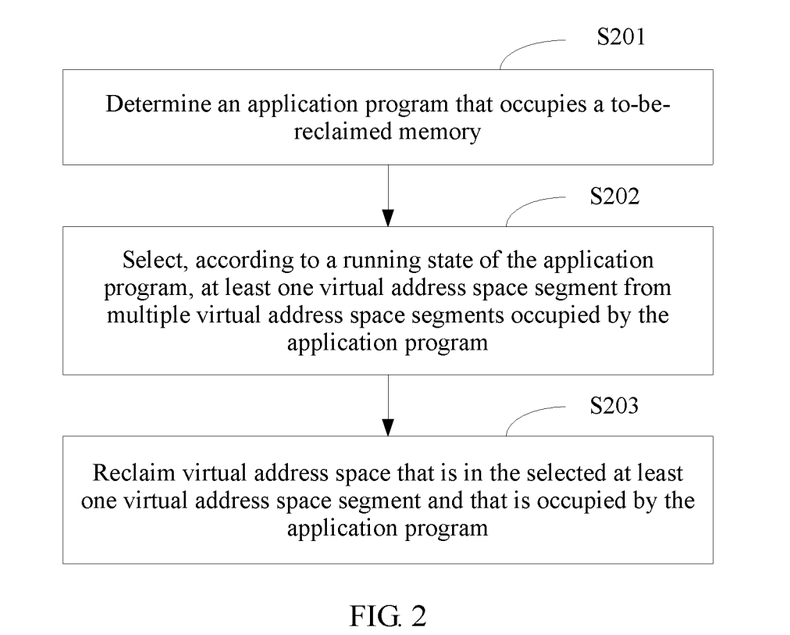
FIG. 2 is a flowchart of a memory reclaiming method according to Embodiment 1 of this application.

As shown in FIG. 2, FIG. 2 is a flowchart of a memory reclaiming method according to Embodiment 1 of this application. The method includes the following steps.

S201. Determine an application program that occupies a to-be-reclaimed memory.

In specific implementation, the application program that occupies the to-be-reclaimed memory may be determined according to a running state of each application program on a terminal.

Figure 3:
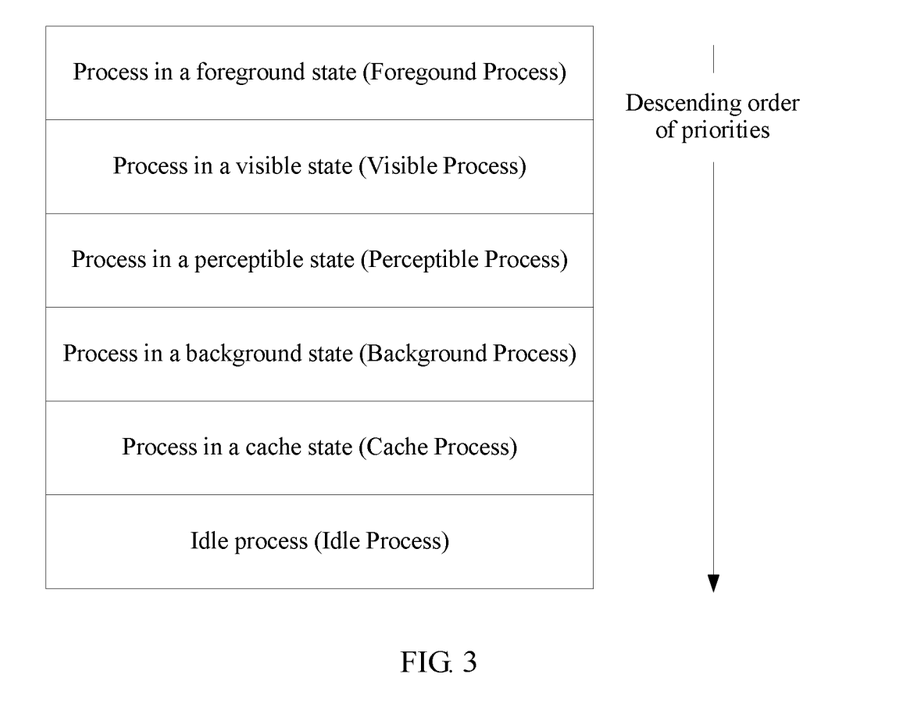
FIG. 3 is a schematic diagram of classifying running states of an application program in descending order of memory occupation priorities.

As shown in FIG. 3, running states of the application program may be classified into a foreground (Foreground) state, a visible (Visible) state, a perceptible (Perceptible) state, a background (Background) state, a cache (Cache) state, an idle (Idle) process state, and the like in descending order of memory occupation priorities. An application program in the foregound state is an application program that is currently being operated by a user in foreground, that is, an application program on which there is currently user interaction. An application program in the visible state is an application program that currently displays a user-operable interface but is not operated by a user. In actual implementation, the foregound state and the visible state may be classified as a same priority state. An application program in the perceptible state is an application program that currently displays an application interface. If the application program is killed, a user can perceive that the application interface is killed, but the application interface is unavailable for the user. For example, a short message service message pops up on an interface of an application program, and the interface of the application program becomes gray, and is in an unavailable state. In this case, the application program is in the perceptible state. An application program in the background state is an application program that runs in background. An application program in the cache state is an application program that is used on frequency less than a specific threshold in a specific period of time. Further, according to access frequency of application data, the cache state may further be divided into states of different priorities (for example, a cache state 1 and a cache state 2 in the following Table 1). An application program in the idle process state is an application program on which no useful component is running. The foregoing running states of the application program are successively the foregound state, the visible state, the perceptible state, the background state, the cache state 1, the cache state 2, and the idle process state in descending order of average access frequency of application data corresponding to the running states. Therefore, priorities of the running states are also arranged in descending order.

In specific implementation, when a memory reclaiming condition is met currently (for example, a memory is insufficient or a memory reclaiming time period arrives, and a specific memory reclaiming trigger condition is not limited in this embodiment of this application), memory reclaiming may be preferably performed on a corresponding application program of a relatively low memory occupation priority according to the running state of each application program on the terminal, until a memory reclaiming termination condition is met.

S202. Select, according to a running state of the application program, at least one virtual address space segment from multiple virtual address space segments occupied by the application program.

In specific implementation, according to the running state of the application program and at least one preset reclaimable virtual address space segment that is separately corresponding to different running states, the at least one virtual address space segment is selected from the multiple virtual address space segments occupied by the application program, and virtual address space that is in the selected virtual address space segment and that is occupied by the application program is reclaimed.

The following Table 1 shows reclaimable virtual address space segments corresponding to different running states of the application program.

TABLE 1

| Running state (arranged in descending order of priorities) | Reclaimable virtual address space segment |
| --- | --- |
| Foregound state and visible state | Is not reclaimed |
| Perceptible state | Least-freq memory segment |
| Background state | Least-freq and less-freq memory segments |
| Cache state 1 | Least-freq, less-freq, and APK/odex memory segments |
| Cache state 2 | Least-freq, less-freq, APK/odex, and file-backed memory segments |
| Idle process state | All memory segments such as Least-freq, less-freq, APK/odex, file-backed, and heap/BSS/stack memory segments |

In Table 1, the APK/odex memory segment, the file-backed memory segment (that is, a file mapping address segment), the heap/BSS/stack memory segment, and the like are original virtual address space segments of an Android process. The APK/odex memory segment is used to store a bytecode file, a character string resource, and the like of the application program. A full name of APK is Android package, and odex is an executable file that is extracted from the APK. The file-backed memory segment is used to store data of a file opened by the application program. The heap/BSS/stack memory segment is used to store common memory data of the application program. Space of a stack (stack) is automatically allocated and released by an operating system, and space of a heap (that is, a heap or a heap memory) is manually applied for and released. A full name of BSS is Block Started by Symbol, and is a memory area that is used to store an uninitialized global variable and an uninitialized static variable in the application program.

The least-freq memory segment and the less-freq memory segment are two virtual address space segments that are newly added in this embodiment of this application. The least-freq memory segment is used to store least-frequently accessed application data in the application program, for example, application data that is accessed on frequency less than or equal to a first threshold in a running time range. The less-freq memory segment is used to store less-frequently accessed application data in the application program, for example, application data that is accessed on frequency less than or equal to a second threshold and greater than the first threshold in the running time range.

It should be noted that a reclaimable virtual address space segment corresponding to each running state includes a reclaimable virtual address space segment corresponding to a running state of a higher priority. For example, for an application program in the background state, in addition to memory space that is in the less-freq memory segment and that is occupied by the application program, memory space that is in the least-freq memory segment and that is occupied by the application program may be reclaimed. For an application program in the cache state 2, in addition to a memory that is in the file-backed memory segment and that is occupied by the application program, memories that are in the APK/odex memory segment, the less-freq memory segment, and the least-freq memory segment and that are occupied by the application program may be reclaimed.

In specific implementation, to-be-reclaimed virtual address space segment may be selected according to reclaiming priorities separately corresponding to virtual address space segments that can be reclaimed in the running states of the application program. The virtual address space segments may be successively the least-freq memory segment, the less-freq memory segment, the APK/odex memory segment, the file-backed memory segment, and the heap/BSS/stack memory segment in descending order of the priorities. Because the running state of the application program changes gradually, when the application program reaches a running state of a lower priority, a reclaimable memory corresponding to a higher priority may have already been reclaimed. For example, when the application program is in the cache state 2, memories that are in the least-freq memory segment, the less-freq memory segment, and the APK/odex memory segment and that are occupied by the application program may have already been reclaimed, and during memory reclaiming performed on the application program, only an occupied memory in the file-backed memory segment can be reclaimed.

S203. Reclaim virtual address space that is in the selected at least one virtual address space segment and that is occupied by the application program.

Herein, performing memory reclaiming on the application program means to: release the virtual address space occupied by the application program, cancel a mapping relationship between the virtual address space occupied by the application program and corresponding physical address space, and clear application data stored in the physical address space.

Figure 4:
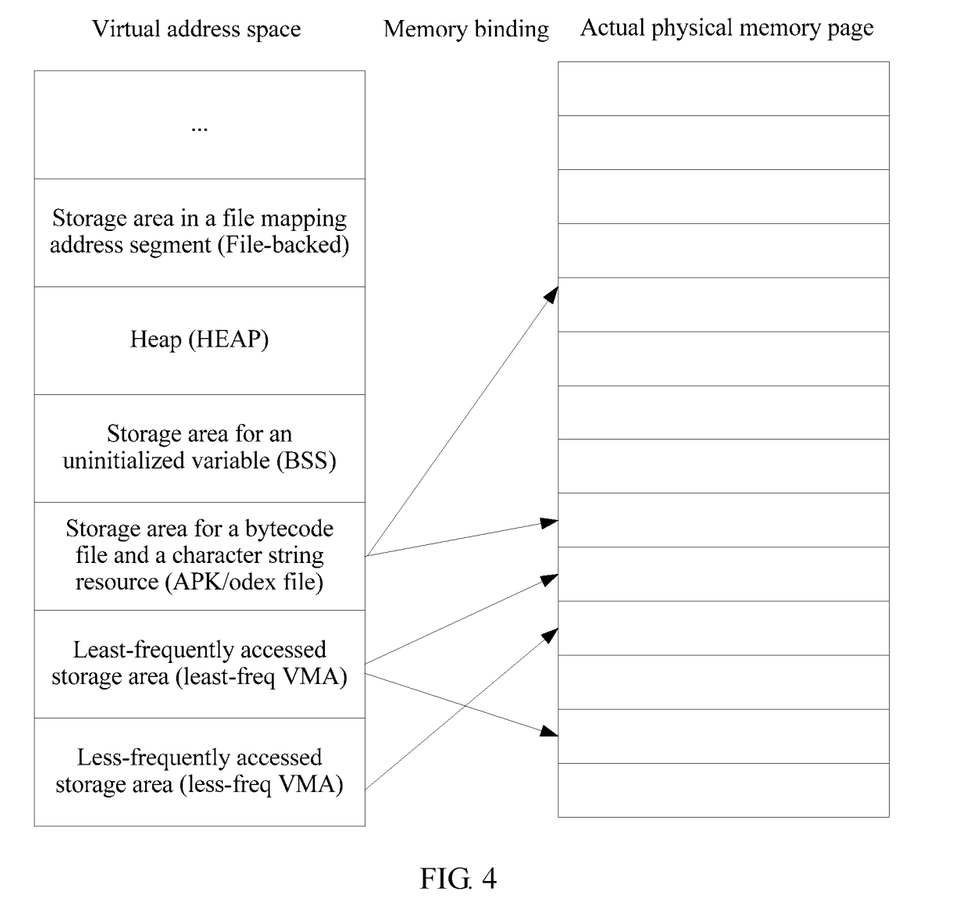
FIG. 4 is a schematic diagram of a memory management manner for an application program.

As shown in FIG. 4, in a Linux system, memory management is performed on an application program by binding (used for memory allocation, that is, establishing a mapping relationship between virtual address space and actual physical address space) and unbinding (used for memory reclaiming, that is, unmapping) the virtual address space and the actual physical address space. Data in physical memory space corresponding to virtual address space of a file mapping type (such as the file-backed memory segment and the APK/odex memory segment) may be directly dropped (drop). For virtual address space of a non-file mapping type (such as the least-freq memory segment, the less-freq memory segment, and the heap memory segment), data is compressed and stored by using a memory compression (ZRAM) technology.

It can be learned based on the foregoing embodiment that in this embodiment of this application, during memory reclaiming, a memory occupied by the application program is not directly reclaimed completely, but instead, only a memory occupied by application data that can be cleared in a running state of the application program is reclaimed according to the running state. In this way, entire application data of the application program does not need to be completely cleared, so that less application data is lost. In addition, a restart speed of the application program can be further improved.

Processes of allocating and reclaiming a memory based on a concept of an embodiment of this application are further described below by using Embodiment 2.

Embodiment 2

Figure 5:
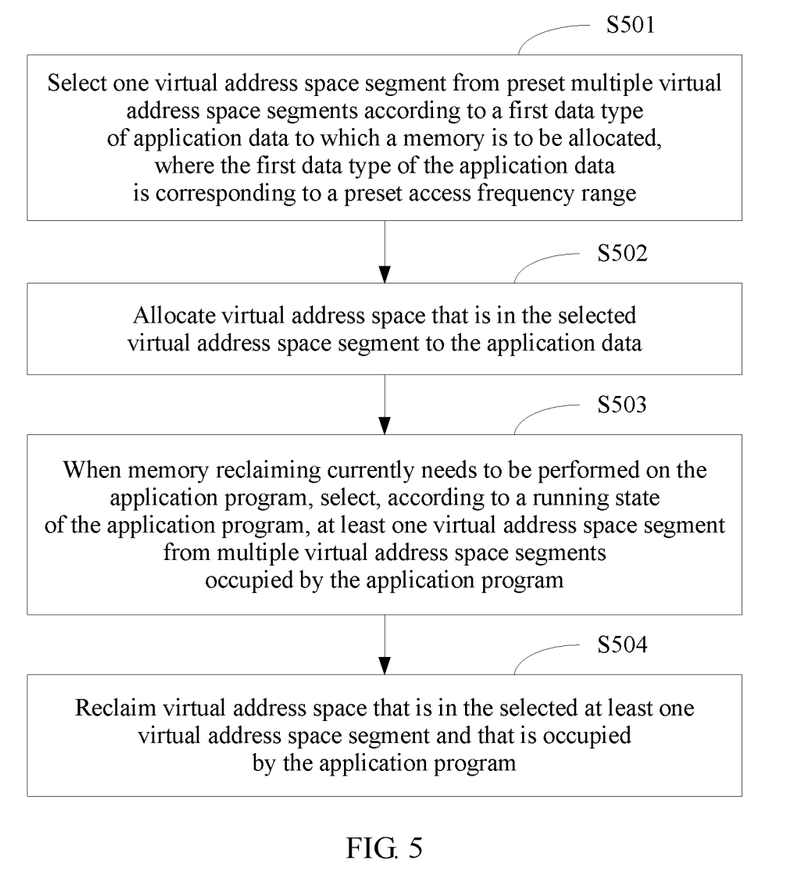
FIG. 5 is a flowchart of a memory reclaiming method according to Embodiment 2 of this application.

As shown in FIG. 5, FIG. 5 is a flowchart of a memory reclaiming method according to Embodiment 2 of this application. The method includes the following steps.

S501. Select one virtual address space segment from preset multiple virtual address space segments according to a first data type of application data to which a memory is to be allocated, where the first data type of the application data is corresponding to a preset access frequency range.

In specific implementation, when a memory needs to be allocated to a type of application data in the application program, one virtual address space segment is selected from the preset multiple virtual address space segments according to the first data type of the application data and preset reclaimable virtual address space segments that are separately corresponding to different data types, and virtual address space in the selected virtual address space segment is allocated to the application data.

The data type herein may include: a bytecode file and a character string resource that are of the application program (corresponding to an APK/odex memory segment), data of a file opened by the application program (corresponding to a file-backed memory segment), and common memory data of the application program (corresponding to a heap/BSS/stack memory segment).

Besides, the data type further includes at least two newly-defined data types in this embodiment of this application, and the at least two newly-defined data types are corresponding to different access frequency ranges, such as a type of least-frequently accessed application data (access frequency is less than or equal to a first threshold, and the type is corresponding to a least-freq memory segment), and a type of less-frequently accessed application data (access frequency is less than or equal to a second threshold and greater than the first threshold, and the type is corresponding to a less-freq memory segment).

In specific implementation, a data type of application data is pre-determined before a memory is allocated to the application data. For the at least two newly-defined data types, frequency on which application data stored in a memory is accessed may be monitored in preset duration, and an access frequency range corresponding to the application data may be determined according to the monitored frequency on which the application data is accessed in the memory and preset multiple access frequency ranges, to determine the first data type of the application data.

In a manner, the application program may be tested and run in a laboratory, to collect frequency on which application data corresponding to each virtual memory area (VMA) is used. In another manner, a collection algorithm is integrated into a user terminal for periodic collection. A Linux page fault technology is mainly used in a collection manner, and a VMA page table that needs to be collected is periodically set to an inaccessible state. When an application program is accessed, a page fault is caused. Therefore, a quantity of times application data corresponding to the VMA is used is recorded.

For example, if the application data in S501 is least-frequently accessed application data in the application program (accessed frequency is less than or equal to the first threshold in a running time range), virtual address space in the least-freq memory segment is allocated to the application data.

S502. Allocate virtual address space that is in the selected virtual address space segment to the application data.

Herein, allocating a memory to an application program means to: allocate virtual address space to the application program, allocate physical address space to the application program from an idle physical memory of a terminal, and establish a mapping relationship between the allocated virtual address space and the allocated physical address space.

Figure 6:
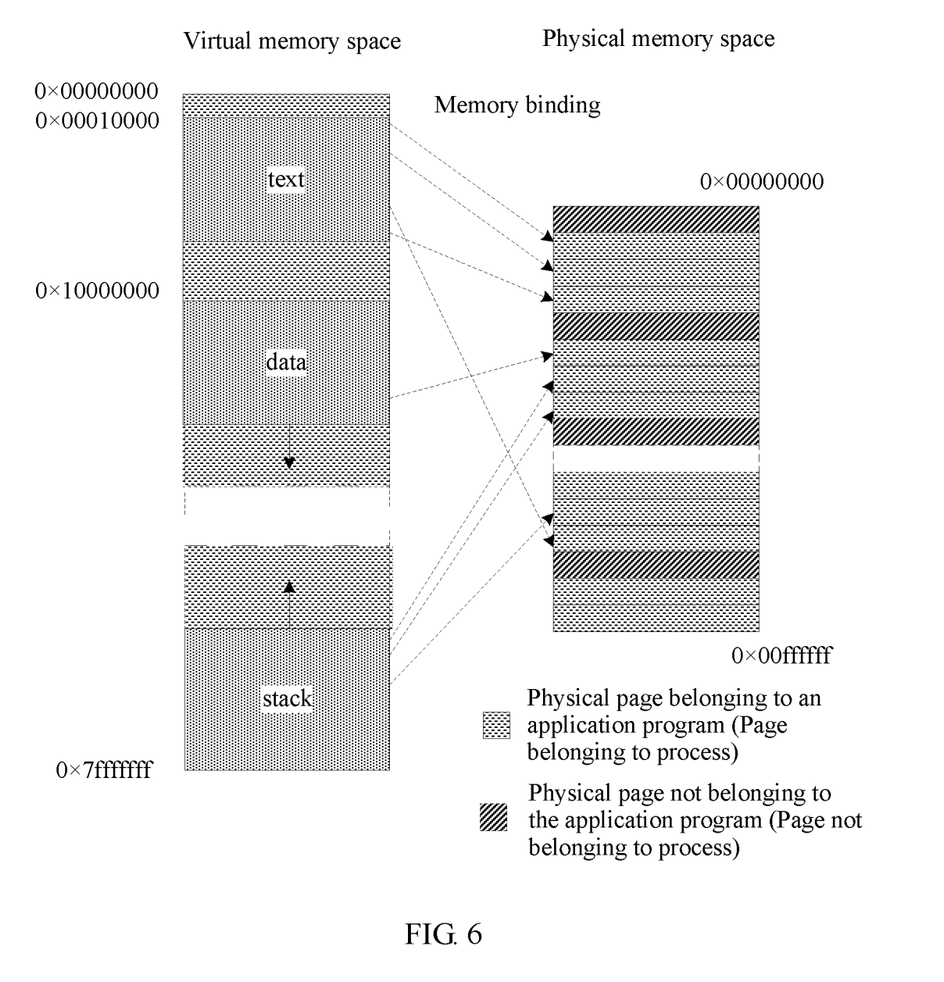
FIG. 6 is a schematic diagram of establishing a mapping relationship between virtual address space and an actual physical address space.

As shown in FIG. 6, after the virtual address space that is in the virtual address space segment and that fits the data type of the application data is allocated to the application data, the virtual address space in a user mode is mapped to physical address space in a kernel mode.

S503. When memory reclaiming currently needs to be performed on the application program, select, according to a running state of the application program, at least one virtual address space segment from multiple virtual address space segments occupied by the application program.

For example, when the application program is currently in a perceptible state, it is determined that virtual address space that is in a least-freq memory segment and that is occupied by the application program is to be reclaimed.

S504. Reclaim virtual address space that is in the selected at least one virtual address space segment and that is occupied by the application program.

Herein, performing memory reclaiming on the application program means to: release the virtual address space occupied by the application program, and cancel a mapping relationship between the virtual address space occupied by the application program and corresponding physical address space. For example, a mapping relationship between the virtual address space that is in the least-freq memory segment and that is occupied by the application program and actual physical address space corresponding to the virtual address space is cancelled, and application data stored in the physical address space is cleared.

Based on a same inventive concept, this embodiment of this application further provides a memory reclaiming apparatus and device that are corresponding to the memory reclaiming method. Principles of resolving a problem by the apparatus and the device are similar to a principle of the memory reclaiming method in this embodiment of this application. Therefore, for implementation of the apparatus and the device, refer to implementation of the method, and a repeated part is not described herein again.

Figure 7:
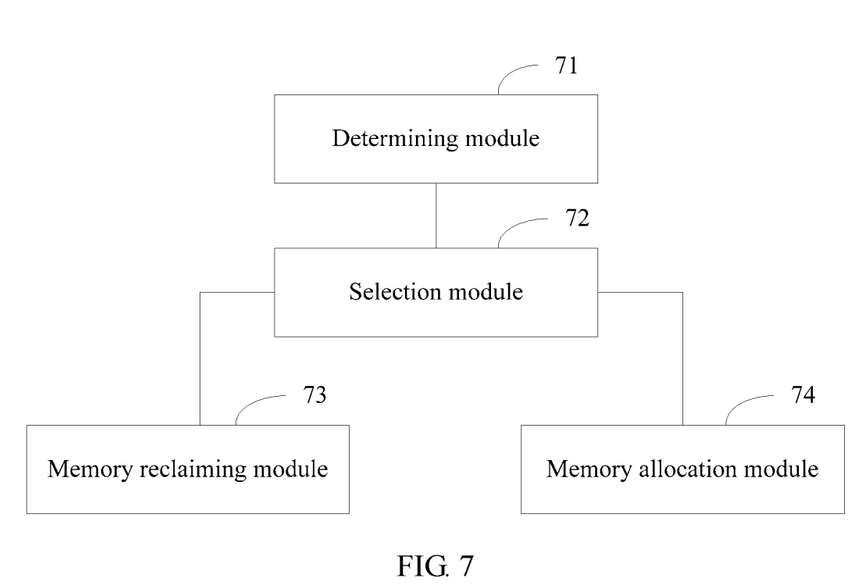
FIG. 7 is a schematic diagram of a memory reclaiming apparatus according to an embodiment of this application.

As shown in FIG. 7, FIG. 7 is a schematic diagram of a memory reclaiming apparatus according to an embodiment of this application. The apparatus includes:

a determining module 71, configured to determine an application program that occupies a to-be-reclaimed memory;

a selection module 72, configured to select, according to a running state of the application program determined by the determining module 71, at least one virtual address space segment from multiple virtual address space segments occupied by the application program; and a memory reclaiming module 73, configured to reclaim virtual address space that is in the at least one virtual address space segment selected by the selection module 72 and that is occupied by the application program.

Optionally, the determining module 71 is specifically configured to:

determine, according to a running state of each application program on a terminal, the application program that occupies the to-be-reclaimed memory.

Optionally, the apparatus further includes:

a memory allocation module 74, configured to: select one virtual address space segment from preset multiple virtual address space segments according to a first data type of application data to which a memory is to be allocated, and allocate virtual address space that is in the selected virtual address space segment to the application data, where the first data type of the application data is corresponding to a preset access frequency range.

Optionally, a type of the application data to which the memory is to be allocated further includes a second data type, and an access frequency range of the second data type is different from the access frequency range of the first data type.

Optionally, the memory allocation module 74 is specifically configured to determine the first data type of the application data according to the following steps:

determining, according to monitored frequency on which the application data is accessed in the memory and preset multiple access frequency ranges, the access frequency range corresponding to the application data, and determining the first data type of the application data according to the access frequency range corresponding to the application data.

Optionally, the selection module 72 is specifically configured to:

select the at least one virtual address space segment according to reclaiming priorities separately corresponding to virtual address space segments that can be reclaimed in the running state.

Figure 8:
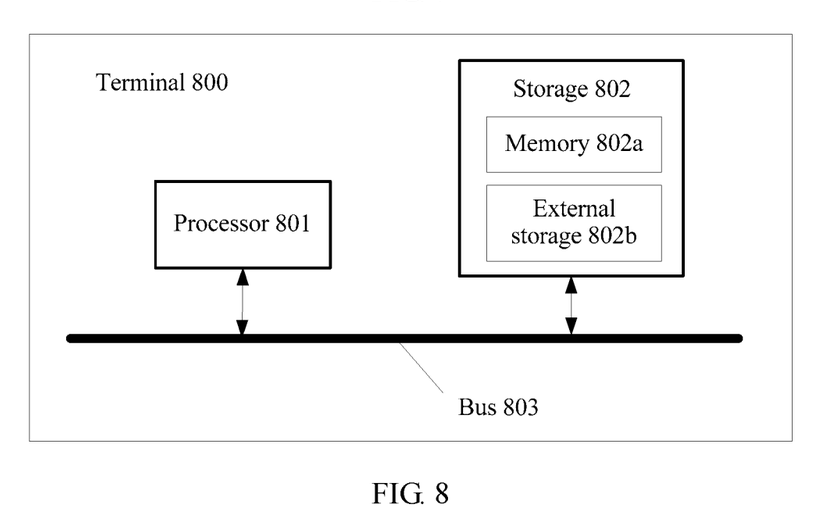
FIG. 8 is a schematic structural diagram of a terminal according to this application.

FIG. 8 shows a structure of a terminal 800 according to an embodiment of this application. The terminal 800 includes: a processor 801, a storage 802, and a communications bus 803, and the communications bus 803 is configured to implement connection and communication between these components. Herein, the storage 802 includes a memory 802a and an external storage 802b. The memory herein is also referred to as an internal storage, and is configured to temporarily store operational data in the processor 801, and data exchanged by the processor 801 with an external storage such as a hard disk. The processor 801 exchanges data with the external storage 802b by using the memory 802a.

The storage 802 stores the following elements: an executable module or a data structure, or a subset thereof, or an extension set thereof.

An operating system includes various system programs, and may have two running levels: a kernel mode and a user mode. When a process performs system invoking but is trapped in kernel code for running, the process is in a kernel running mode that is referred to as a kernel mode for short. When the process is in the kernel mode, kernel code to be executed uses a kernel stack of the current process. Each process has a kernel stack. When user code is executed in the process, the process is in a user running mode that is referred to as a user mode for short. In this case, the processor 801 runs in user code of a lowest privilege level.

An application program module includes various application programs (applications for short).

In this embodiment of this application, by invoking a program or an instruction stored in the storage 802, the processor 801 performs the following operations:

determining an application program that occupies a to-be-reclaimed memory;

selecting, according to a running state of the application program, at least one virtual address space segment from multiple virtual address space segments occupied by the application program; and reclaiming virtual address space that is in the selected at least one virtual address space segment and that is occupied by the application program.

Optionally, the processor 801 is specifically configured to:

determine, according to a running state of each application program on the terminal, the application program that occupies the to-be-reclaimed memory.

Optionally, the processor 801 is specifically configured to:

select one virtual address space segment from preset multiple virtual address space segments according to a first data type of application data to which a memory is to be allocated, and allocate virtual address space that is in the selected virtual address space segment to the application data, where the first data type of the application data is corresponding to a preset access frequency range.

Optionally, a type of the application data to which the memory is to be allocated further includes a second data type, and an access frequency range of the second data type is different from the access frequency range of the first data type.

Optionally, the processor 801 is specifically configured to determine the first data type of the application data according to the following steps:

determining, according to monitored frequency on which the application data is accessed in the memory and preset multiple access frequency ranges, the access frequency range corresponding to the application data, and determining the first data type of the application data according to the access frequency range corresponding to the application data.

Optionally, the processor 801 is specifically configured to:

select the at least one virtual address space segment according to reclaiming priorities separately corresponding to virtual address space segments that can be reclaimed in the running state.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the apparatus (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the scope of this application. This application is intended to cover these modifications and variations of this application provided that they fall within the scope of protection defined by the following claims and their equivalent technologies.

What is claimed is:

1. A memory reclaiming method, wherein the method comprises:
   determining an application program that occupies a to-be-reclaimed memory from a plurality of application programs running on a terminal, according to a running state of each application program on the terminal, wherein the running state of each application program on the terminal describes a current execution state of each application program on the terminal;
   selecting, according to the running state of the application program, at least one virtual address space segment from multiple virtual address space segments occupied by the application program; and
   reclaiming virtual address space that is in the selected at least one virtual address space segment and that is occupied by the application program, wherein reclaiming the virtual address space includes:
      releasing the virtual address space occupied by the application program;
      cancelling a mapping relationship between the virtual address space occupied by the application program and corresponding physical address space; and
      clearing application data stored in the physical address space.

2. The method according to claim 1, wherein the method further comprises:
   selecting one virtual address space segment from preset multiple virtual address space segments according to a first data type of application data to which a memory is to be allocated; and
   allocating virtual address space that is in the selected virtual address space segment to the application data, wherein the first data type of the application data is corresponding to a preset access frequency range.

3. The method according to claim 2, wherein a type of the application data to which the memory is to be allocated further comprises a second data type, and wherein an access frequency range of the second data type is different from the access frequency range of the first data type.

4. The method according to claim 2, wherein the first data type of the application data is determined according to the following steps:
   determining, according to monitored frequency on which the application data is accessed in the memory and preset multiple access frequency ranges, the access frequency range corresponding to the application data; and
   determining the first data type of the application data according to the access frequency range corresponding to the application data.

5. The method according to claim 1, wherein the selecting, according to a running state of the application program, at least one virtual address space segment from multiple virtual address space segments occupied by the application program comprises:
   selecting the at least one virtual address space segment according to reclaiming priorities separately corresponding to virtual address space segments that can be reclaimed in the running state.

6. The method according to claim 1, wherein the running state of each application program on the terminal is one of a plurality of running states comprising a foreground state, a visible state, a perceptible state, a background state, a cache state, and an idle process state.

7. A memory reclaiming apparatus, wherein the apparatus comprises:
   at least one processor; and
   a non-transitory computer-readable storage medium coupled to the at least one processor and storing programming instructions for execution by the at least one processor, the programming instructions instruct the at least one processor to:
      determine an application program that occupies a to-be-reclaimed memory from a plurality of application programs running on a terminal, according to a running state of each application program on the terminal, wherein the running state of each application program on the terminal describes a current execution state of each application program on the terminal;
      select, according to the running state of the determined application program, at least one virtual address space segment from multiple virtual address space segments occupied by the application program; and
      reclaim virtual address space that is in the at least one virtual address space segment selected and that is occupied by the application program, wherein reclaiming the virtual address space includes:

releasing the virtual address space occupied by the application program;
cancelling a mapping relationship between the virtual address space occupied by the application program and corresponding physical address space; and
clearing application data stored in the physical address space.

8. The apparatus according to claim 7, wherein the programming instructions instruct the at least one processor to:
select one virtual address space segment from preset multiple virtual address space segments according to a first data type of application data to which a memory is to be allocated; and
allocate virtual address space that is in the selected virtual address space segment to the application data, wherein the first data type of the application data is corresponding to a preset access frequency range.

9. The apparatus according to claim 8 wherein a type of the application data to which the memory is to be allocated further comprises a second data type, and wherein an access frequency range of the second data type is different from the access frequency range of the first data type.

10. The apparatus according to claim 8, wherein the programming instructions instruct the at least one processor to determine the first data type of the application data according to the following steps:
determining, according to monitored frequency on which the application data is accessed in the memory and preset multiple access frequency ranges, the access frequency range corresponding to the application data; and
determining the first data type of the application data according to the access frequency range corresponding to the application data.

11. The apparatus according to claim 7, wherein the programming instructions instruct the at least one processor to:
select the at least one virtual address space segment according to reclaiming priorities separately corresponding to virtual address space segments that can be reclaimed in the running state.

12. A terminal, comprising at least one processor, a computer-readable storage, and a communications bus, wherein the communications bus is configured to implement connection and communication between the at least one processor and the computer-readable storage, and the at least one processor is configured to execute the following instructions stored in the computer-readable storage:
determining an application program that occupies a to-be-reclaimed memory from a plurality of application programs running on the terminal, according to a running state of each application program on the terminal, wherein the running state of each application program on the terminal describes a current execution state of each application program on the terminal;
selecting, according to the running state of the application program, at least one virtual address space segment from multiple virtual address space segments occupied by the application program; and
reclaiming virtual address space that is in the selected at least one virtual address space segment and that is occupied by the application program, wherein reclaiming the virtual address space includes:
releasing the virtual address space occupied by the application program;
cancelling a mapping relationship between the virtual address space occupied by the application program and corresponding physical address space; and
clearing application data stored in the physical address space.

13. The terminal according to claim 12, the at least one processor is further configured to execute the following instructions stored in the computer-readable storage:
selecting one virtual address space segment from preset multiple virtual address space segments according to a first data type of application data to which a memory is to be allocated; and
allocating virtual address space that is in the selected virtual address space segment to the application data, wherein the first data type of the application data is corresponding to a preset access frequency range.

14. The terminal according to claim 13, wherein a type of the application data to which the memory is to be allocated further comprises a second data type, and wherein an access frequency range of the second data type is different from the access frequency range of the first data type.

15. The terminal according to claim 13, the at least one processor is further configured to execute the following instructions stored in the computer-readable storage:
determining, according to monitored frequency on which the application data is accessed in the memory and preset multiple access frequency ranges, the access frequency range corresponding to the application data; and
determining the first data type of the application data according to the access frequency range corresponding to the application data.

16. The terminal according to claim 12, the at least one processor is further configured to select the at least one virtual address space segment according to reclaiming priorities separately corresponding to virtual address space segments that can be reclaimed in the running state.

17. A non-transitory computer-readable storage medium, the non-transitory computer-readable storage medium including instructions, when executed, configured to control a computer device to perform operations comprising:
determining an application program that occupies a to-be-reclaimed memory from a plurality of application programs running on a terminal, according to a running state of each application program on the terminal, wherein the running state of each application program on the terminal describes a current execution state of each application program on the terminal;
selecting, according to the running state of the application program, at least one virtual address space segment from multiple virtual address space segments occupied by the application program; and
reclaiming virtual address space that is in the selected at least one virtual address space segment and that is occupied by the application program, wherein reclaiming the virtual address space includes:
releasing the virtual address space occupied by the application program;
cancelling a mapping relationship between the virtual address space occupied by the application program and corresponding physical address space; and
clearing application data stored in the physical address space.

* * * * *